W. H. AND C. W. BRISTOL.
FLUID GAGE.
APPLICATION FILED FEB. 11, 1919.
1,371,018.
Patented Mar. 8, 1921.
2 SHEETS—SHEET 1.
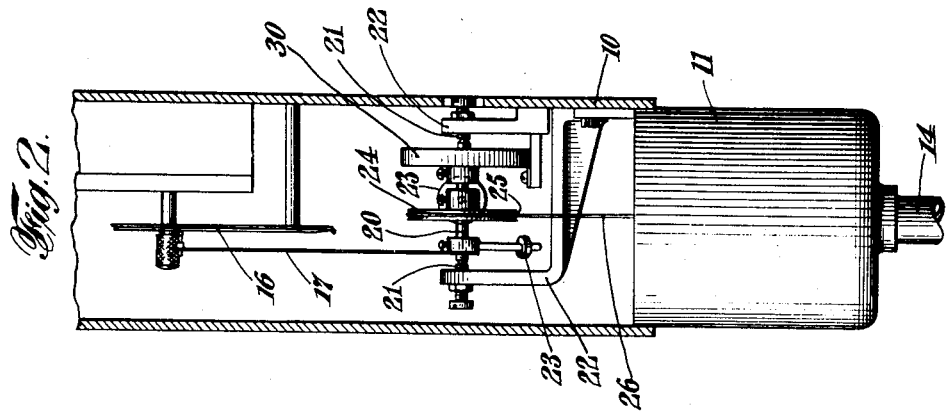
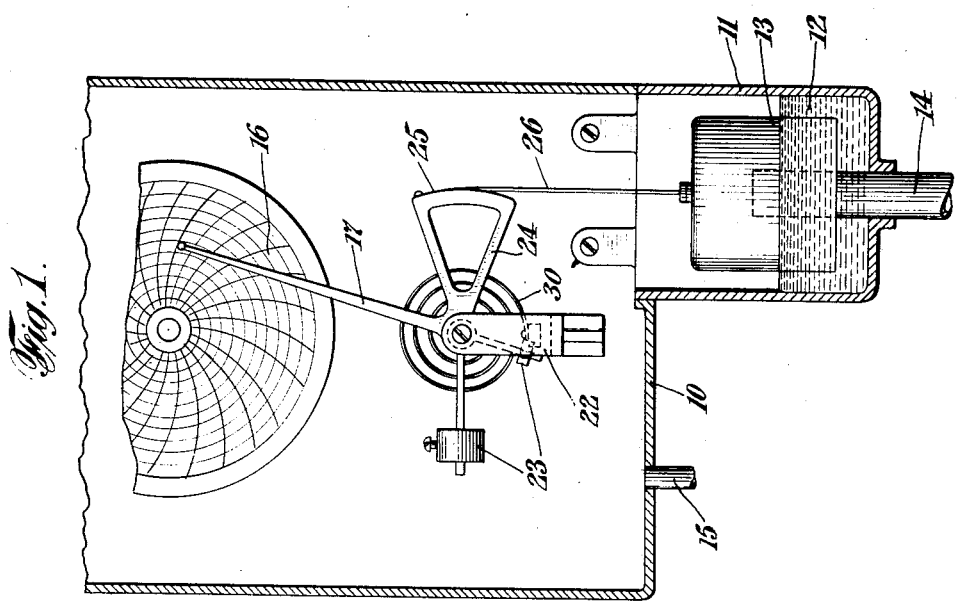
Inventors
William H. Bristol
Carlton W. Bristol
By their Attorney W. H. AND C. W. BRISTOL.
FLUID GAGE.
APPLICATION FILED FEB. 11, 1919.
1,371,018.
Patented Mar. 8, 1921.
2 SHEETS—SHEET 2.
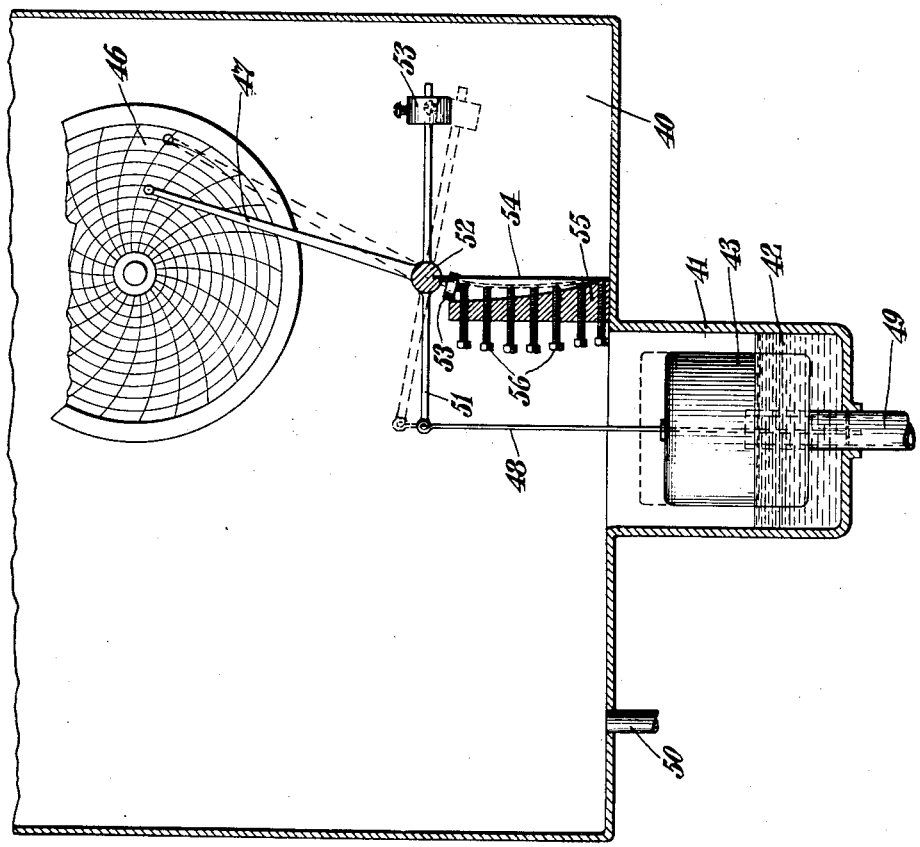
Inventors
William H. Bristol
Carlton W. Bristol
By their Attorney

UNITED STATES PATENT OFFICE.

WILLIAM H. BRISTOL, OF WATERBURY, AND CARLTON W. BRISTOL, OF NAUGATUCK, CONNECTICUT, ASSIGNORS TO THE BRISTOL COMPANY, OF WATERBURY, CONNECTICUT, A CORPORATION OF CONNECTICUT.

FLUID-GAGE.

1,371,018.   Specification of Letters Patent.   Patented Mar. 8, 1921.

Application filed February 11, 1919. Serial No. 276,355.

*To all whom it may concern:*

Be it known that we, WILLIAM H. BRISTOL and CARLTON W. BRISTOL, citizens of the United States, and residents of Waterbury and Naugatuck, respectively, in the county of New Haven and State of Connecticut, have invented certain new and useful Improvements in Fluid-Gages, of which the following is a specification.

The invention relates to measuring instruments as adapted to the measurement of the pressure of fluids, being particularly suitable for the measurement of low pressure or small differences of pressure such as met with in the determination of flue pressures and the measurement of the flow of gases and liquids.

It has for its object to provide an instrument of this character which will be positive and reliable in its action, simple in construction and unaffected by a reasonable rocking of its support, or change of level of the instrument as a whole. A further object of the invention consists in means for rendering the instrument capable of adjustment to a particular law.

In the accompanying drawings, which illustrate the invention, and wherein the same is shown as embodied in a recording type of measuring instrument—

Figure 1 illustrates, in elevation, a vacuum gage, the inclosing casing therefor being shown in section and a portion of the top and chart broken away.

Fig. 2 is a similar side elevation.

Fig. 3 is a view similar to Fig. 1, and illustrates a modification.

Fig. 4 is a detail view of the pen arm spindle, and resilient means acting thereon, of the gage shown in Fig. 3.

Similar characters of reference designate corresponding parts throughout the several views.

Referring to the drawings, and more particularly to Figs. 1 and 2 thereof, 10 designates a suitable casing or container for the mechanism, being provided at the bottom thereof with an auxiliary casing 11 serving as a liquid retainer and in which is contained a suitable liquid 12 upon which is caused to float a bell 13. Ample clearance is provided between the bell and its casing to permit of a reasonable freedom of movement of the latter without interference in the action of the former. Into the said bell projects, above the liquid level, an inlet member or tube 14 for the fluid whose pressure is to be determined; and the casing 10, furthermore, may be provided with an opening to the atmosphere, or with a pressure connection 15 by which communication may be had with some variable source of pressure (not shown) when the instrument is to be used as a differential pressure gage.

Within the casing 10 is mounted a rotating chart 16 of usual and well-known type and over which is designed to be moved, under the influence of the pressure variations, the recording member or pen arm 17. The movement of the arm 17 is a function of the pressure within the bell 13, or rather of the differential pressure existing between the pressure in the interior of the casing 10 and in the interior of said bell 13, the downward movement produced thereby upon said bell being transmitted in the following manner to the said recording member 17. The latter, for this purpose, is secured to and movable with a spindle 20, Fig. 2, rotatably mounted in the casing as by suitable pivots 21 in brackets 22 secured to the casing. Counterweights 23 are also secured to the spindle 20 to counter balance the weight of said recording member and a segmental member or arm 24 extending outwardly therefrom over the bell 13 and mounted to oscillate in the plane of its longitudinal axis. The circumference of member 24 is provided with a groove 25 in the arc of a circle whose center lies in the axis of spindle 20; and a cord or similar flexible member 26 is attached at one end to the upper end of the segmental member, and at the other end to the top of the bell 13, being retained in the groove 25 of said segmental member to wind and unwind thereon.

To counteract the weight of the bell at a predetermined force of the pressure existing therein or rather upon the bell, a spiral spring member 30 is secured at one end to the spindle 20, and at the other end to the casing 10 whereby, as the pressure in or on the bell is reduced, in the case of the vacuum gage shown, the segmental member 24 will, under the influence of the said spring, move downwardly, owing to the disturbance of equilibrium; and the recording member 17 will be caused to move outwardly over the chart 16 to effect a record. The gage shown in Figs. 1 and 2 is designed for use as a vacuum gage, or for measurement of pressure below a predetermined pressure; and when used as a differential pressure gage, the lower pressure is admitted to the interior of the bell and the higher to the interior of the casing.

Moreover, it will be noted that when the bell is thus suspended by a flexible cord or the like, owing to the considerable clearance allowed the bell, a reasonable amount of rocking of the auxiliary casing 11 or change of level of the instrument as a whole will not act to disturb indications, the pressure effect upon the top of the bell remaining constant.

Figs. 3 and 4 illustrate a construction whereby the gage is suitable for the measurement of pressures above a predetermined initial pressure; or of a pressure higher than that existing within the casing. In this instance, the mechanism is suitably mounted in a casing 40 provided with an auxiliary casing 41 to retain liquid 42 and a bell 43. The recording mechanism is similar to that shown in the Figs. 1 and 2, comprising a rotating chart 46 and a recording member or pen arm 47. The motion of said arm is derived, however, by the upward movement of the bell 43, which is transmitted by means of a rod or rigid member 48 extending vertically upward from the top of the bell 43 and suitably guided in the bottom of auxiliary casing 41 or rather inlet 49 thereof. The casing 40, also, is provided with an outlet to the atmosphere or with a pressure connection 50.

The outer end of the rod 48 is movably connected to an arm 51 which in turn is secured to a spindle 52 as in the case of the mechanism shown in Figs. 1 and 2, carrying also counterweights 53. The spring 54, introducing a predetermined force, however, consists of a member, Fig. 4, which may be of varying cross-section, as for example a flat strip tapering from the spindle downwardly, as shown, the one end of same being attached to the said spindle and the other and free end engaging a curved abutment 55. In this manner, a slight force only is exerted by said spring 54 at the beginning of the upward motion of the bell 43; but, as the free end of same is gradually turned over upon the abutment surface, the spring becomes, in effect, shorter and more rigid and also of increasing average width. This gradually increases the counteracting force and correspondingly reduces the movement of the recording member for equal increments of pressure.

To have this motion conform to a particular law, such as the law of squares, the curvature of the abutment member 55 may be formed accordingly or, better, as shown in Fig. 3 of the drawings, a plurality of adjusting screws 56, extending through the member, may be provided and so adjusted that their operative projecting ends will constitute the proper curvature. In this manner, any desired scale may be obtained in a very simple and effective manner.

We claim:

1. A measuring instrument, comprising a casing adapted to retain liquid, a single bell floating in said liquid, means to introduce fluid under pressure therein, a spindle rotatably mounted in the casing, means connecting same with said bell, counterweighting means acting upon said spindle to balance the effective weight of the connecting mechanism, a measuring member movable with said spindle, and resilient means operating on said spindle to position said measuring member for a predetermined pressure on the bell.

2. A measuring instrument, comprising a casing adapted to retain liquid, a single bell floating in said liquid, means to introduce fluid under pressure therein, a spindle rotatably mounted in the casing, means connecting same with said bell, counterweighting means acting upon said spindle to balance the effective weight of the connecting mechanism, a measuring member movable with said spindle, counterweighting means for same, and resilient means operating on said spindle to position said measuring member for a predetermined pressure on the bell.

3. A measuring instrument, comprising a casing adapted to retain liquid, a single bell floating in said liquid, means to introduce fluid under pressure therein, a spindle rotatably mounted in the casing, arcuate means and a cord secured thereto, adapted to wind thereon and connecting the spindle with said bell, counterweighting means acting upon said spindle to balance the effective weight of the connecting mechanism, a measuring member movable with said spindle, and resilient means operating on said spindle to position said measuring member for a predetermined pressure on the bell.

Signed at Waterbury, in the county of New Haven and State of Connecticut, this 7th day of February, A. D. 1919.

WILLIAM H. BRISTOL.
CARLTON W. BRISTOL.

Witness:
SAMUEL R. BRISTOL.